TELEPHONE SELECTOR AND CONNECTOR CIRCUITS

Filed Sept. 26, 1958 2 Sheets-Sheet 1

INVENTOR.
PIER BAKKER
BY C. R. Sipis
ATTY.

TELEPHONE SELECTOR AND CONNECTOR CIRCUITS

Filed Sept. 26, 1958 2 Sheets-Sheet 2

INVENTOR.
PIER BAKKER
BY C. R. Sipe
ATTY.

United States Patent Office 2,966,555
Patented Dec. 27, 1960

2,966,555

TELEPHONE SELECTOR AND CONNECTOR CIRCUITS

Pier Bakker, Springfield, S. Dak., assignor to Automatic Electric Laboratories, Inc., a corporation of Delaware Filed Sept. 26, 1958, Ser. No. 763,702
12 Claims. (Cl. 179—18)

This invention relates to telephone systems and more particularly to selectors and connectors in a system of the step-by-step type.

It is an object of the present invention to provide a telephone system in which many of the normal functions of the system are performed in a more advantageous and improved manner.

Another object of the invention is to provide a system in which many of the functions normally performed in the connector circuit are controlled in the selector circuit.

A further object of the invention is to provide in a terminal per station telephone system, ringing control by the use of the extra control conductor.

Further objects and features will be obvious when viewed in light of the drawings in which:

Fig. 1 shows a selector switch circuit having many of the usual connector functions in addition to the normal selector functions and Fig. 2 shows a connector switch circuit.

GENERAL DESCRIPTION

The switches shown fit into a dial controlled telephone system of the well-known Strowger or step-by-step type. The remainder of the system operates in a generally known manner.

The switches as shown are of the battery searching type although no ingenuity would be required to adapt this system to absence-of-ground searching. The selector is provided with normal post springs operative on specified levels to switch through and thereby utilize as transmission relays, relays in a distant exchange. This feature is especially useful in toll systems. On all levels, however, the remainder of the switch functioning is virtually the same as that of most of the known step-by-step systems.

The connector is also shown with normal post springs for the purpose of providing automatic trunk hunting service on specified levels.

The system is further adapted as mentioned for use in a terminal per station system which utilizes four wire central office switching. The four wires include the two talking conductors, a control lead and an extra control lead. A system such as this is shown generally in U.S. Patent 2,773,126, issued December 4, 1956 to C. E. Lomax.

DETAILED DESCRIPTION

*Selector normal operation*

Figure 1:
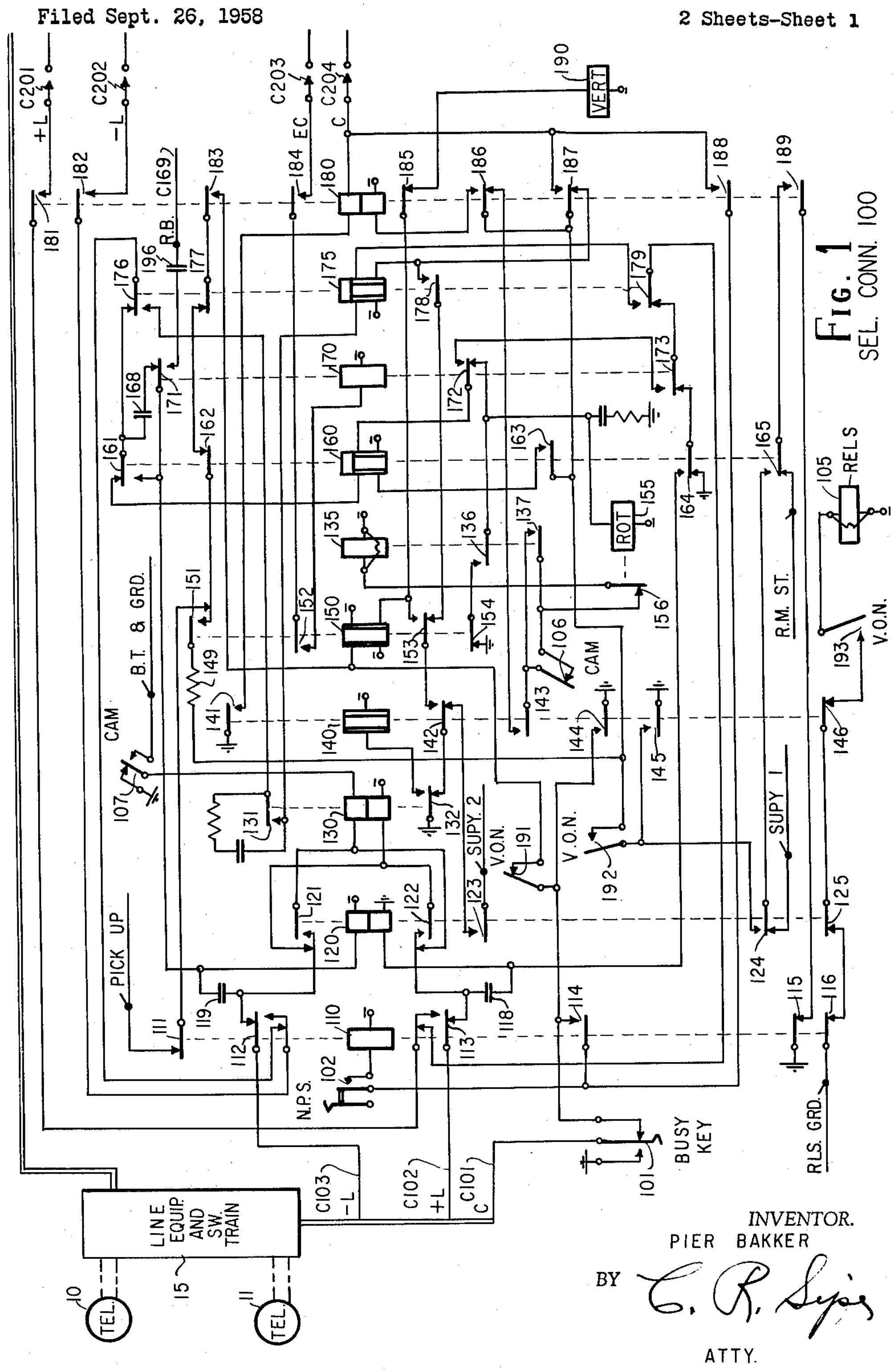

When a substation such as 10 desires to initiate a call, the usual central office equipment 15 comprising line equipment, line finders and selectors is seized and the equipment operates in a known manner. Selector 100 is seized over the C lead C101 from the prior selector switch banks. Battery is found on this lead over the path as follows: lead C101, contacts 101, VON spring 191, the upper winding of relay 150 and battery.

Since ground is transmitted from the prior switch on this lead, relay 150 operates. A number of preparatory circuits are thereby closed at the contacts of relay 150.

The closed line loop at the two line leads C102 and C103 close a circuit to relay 130. This closed circuit includes: battery, the lower winding of relay 130, contacts 121, 112, the closed loop over leads C103 and C102, contacts 113 and 122, upper winding of relay 130, and cam springs 107 to ground.

As relay 130 operates, contacts 132 close an obvious circuit to relay 140. Relay 140 operates. Contacts 141 close to provide a resistance ground through the upper winding of relay 180 to the outgoing C lead C204.

With relays 130, 140, and 150 operated, selector 100 is then ready to receive and respond to dial pulses Relay 130 follows these pulses and pulses contacts 132 in response. A pulsing circuit from ground at contacts 132 through contacts 142, 153, and 185 causes vertical magnet 190 to respond and vertically step the switch 100. As the switch steps vertically, the VON springs 191 and 192 operate. Contacts 191 open the operate circuit to relay 150 which remains operated during its slow-to-release period. Contacts 192 close a multiple ground path to relays 135 and 175. This ground at closed contacts 145 continues through contacts 192, contacts 187 to the lower winding of ring control relay 175 and battery. This ground also is fed through contacts 186 and 143, cam springs 106, rotary interrupter contacts 156, relay 135, and battery.

Relays 135 and 175 operate. At contacts 136, ground is closed from closed contacts 154 to rotary magnet 155. At contacts 137, relay 135 locks itself operated over a path in multiple with the cam springs 106. When the rotary magnet 155 is energized, rotary interrupter springs 156 open, thus opening the operate path to relay 135. By the alternate opening and closing of relay 135 and magnet 155, the switch steps self-interruptedly until an idle trunk is found by the switch wipers.

When an idle trunk is found, battery is returned on the C lead C204, through the upper winding of relay 180 and contacts 141 to gruond. When relay 180 operates, contacts 186 open the operate path to relay 135 which releases then to stop rotary motion. Contacts 189 close the ring machine start lead through contacts 165, 189, 115 to ground to start the ringing machine in operation. A holding path for relay 180 is closed from battery, lower winding of relay 180, contacts 186, VON springs 192, contacts 145 to ground. Assuming that the idle trunk found is that leading to connector 200, the battery sent back on lead C204 to selector 100 would be transmitted from battery at resistor 283 (of connector 200) through VON contacts 284, contacts 297, busy key contacts 201 to lead C204 and into selector 100.

*Selector switch through*

On specified selector levels, normal post springs 102 will operate at the conclusion of vertical stepping. When relay 180 has operated due to receipt of battery on lead C204 from the subsequent switch in the train, contacts 188 are closed connecting relay 110 through normal post springs 102, contacts 188 to the multiple hold ground on lead C204. This multiple hold ground is the circuit previously described through the upper winding on relay 180 and contacts 141 to ground. A second path of this multiple hold ground occurs over the hold path for relay 180 previously described, namely: ground at contacts 145, VON springs 192 and then through contacts 187 which are now closed to lead C204.

Relay 110 then operates contacts 114 locking itself to the ground sent from on lead C204 through closed contacts 188. At contacts 115 ringing machine control is opened permanently. At contacts 112 and 113, the line leads C102 and C103 are switched directly through contacts 181 and 182 respectively and out leads C201 and C202 respectively. This usage is preferred in instances where the normal post selector levels lead to a distant exchange which will supply ringing control and transmission battery.

*Seizure of the connector on non-switch-through selector levels*

At this time relays 130, 140, 175, and 180 in selector 100 remain operated as described.

Further, on the operation of relay 180 and subsequent closure of contacts 181 and 182 a circuit is completed to relay 210. This circuit includes battery, winding of relay 210, contacts 261, 271, lead C202, contacts 182, 112, 176, 131, the upper winding of 175, contacts 179, 113, 181, lead C201 and contacts 277 to ground. Relay 210 will operate and relay 175 will be held operated over this circuit. Contacts 212 are closed completing an operate path to relay 220 as follows: battery, winding of relay 220, VON springs 282, contacts 212, 297, 201, to the previously described multiple hold ground on lead C204. Relay 220 operates preparing a pulsing path to the vertical magnet 280. The connector has now been seized and is ready to be pulsed.

Dial pulses continue to be fed into selector 100 thus pulsing relay 130. Contacts 131 follow these pulses opening and closing the operate path to connector line relay 210. Relay 210 is thereby pulsed. At contacts 211, the path through contacts 221 to vertical magnet 280 is successively opened and closed causing connector switch 200 to be stepped vertically accordingly. Relay 220, a slow-to-release relay, remains operated throughout vertical pulsing. At the conclusion of vertical pulsing, relay 220 releases. After the switch steps vertically, VON springs 282 close thus completing a path from battery at relay 230, through RON springs 287, contacts 222, VON springs 282, contacts 212, 297, 201, C204 to the ground previously used for the operation of relay 220. The connector switch 200 is then ready for rotary stepping either under the direction of dial pulses or self-interruptedly to provide trunk hunting service. Which method of rotary stepping is used is dependent on the level reached by the switch 200 as a result of vertical stepping. For trunk-hunting, normal post springs 299 are provided which operate when a specified level is reached. Trunk-hunting operation will be described subsequently in this specification.

For dial controlled rotary stepping, relay 230 has operated over the previously mentioned path to ground through lead C204. At contacts 232, the rotary magnet 285 is closed to pulsing contacts 211. At contacts 234, ground is closed to the lower winding of relay 250 for operating it. At contacts 251, the operate path to relay 210 is opened, however, the path was transferred directly through the incoming lead C202 to a previously mentioned pulse transmitting circuit. Relay 210 thereafter responds to transmitted dial pulses opening and closing contacts 211, thus causing rotary magnet 285 to step the switch to the selected station terminals leading to a called station such as 12. At the conclusion of rotary stepping, relay 230 and its slave relay 250 remain operated. The called station 12 is tested on the C lead C294 for busy ground or idle resistance battery.

*Busy called station*

If the called station 12 is busy, ground appears on lead C294 and is transmitted through contacts 254 and 274 to the combined busy-ring relay 260 and battery. At contacts 262, an alternate hold path for relay 260 is prepared. After a time interval subsequent to the completion of rotary stepping and final reoperation of relay 210, contacts 212 reoperate opening the operate path to relay 230; slow-to-release relay 230 restores opening the operate path to relay 250 which also restores. The alternate hold path from battery at the lower winding of relay 260 through contacts 274, 254, 262, 297 lock relay 260 to the ground on lead C204 as previously mentioned which maintains relay 260 operated.

At contacts 261, the operate path to relays 210 and 175 is opened and these relays release. Busy tone is then transmitted from lead C268, through condenser 267, contacts 261, 271, lead C202, contacts 182, lower contacts 112, 176, condenser 168, contacts 171, condenser 119, upper contacts 112 and lead C103 to the calling party. Busy tone continues until the calling party releases the line circuit. The system will then restore in an obvious fashion.

*Idle called station—Ringing*

If the called station 12 is idle, resistance battery is received on lead C294 from the line relay in a known manner and relay 260 cannot operate. When relay 250 has restored as described previously, the resistance battery on lead C294 is fed through contacts 254, lower winding of relay 270, VON springs 282, contacts 212, and springs 297 and 201 to the multiple holding ground on lead C204 as previously described. Relay 270 operates. At contacts 271, the operate path to relays 210 and 175 is opened and these relays release. At contacts 273, relay 270 is locked to the multiple hold ground on lead C204. At contacts 275, the lead C294 is grounded.

Figure 2:
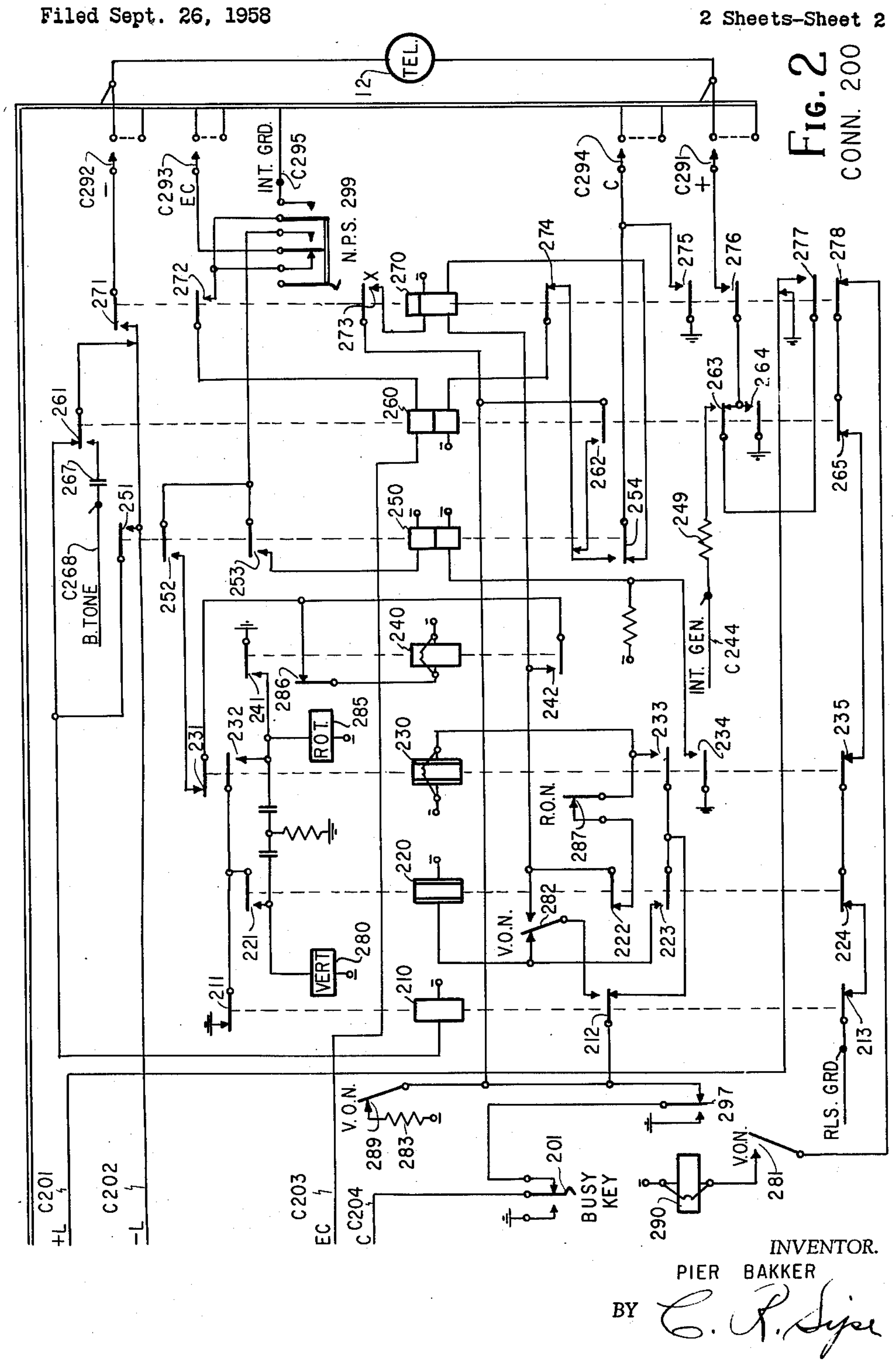

After relay 175 has released, a circuit is closed from the ground on the PU lead (Fig. 1) through contacts 111, 151, 162, 177, and 183 to pick-up relay 150 via its upper winding and battery. Relay 150 operates and locks itself to the ground on lead C204 as follows: battery, the upper winding of relay 150, contacts 183, 177, 162, 151, resistor 149, contacts 187 to lead C204 and its multiple hold ground. At contacts 152, battery at relay 170 is closed through contacts 184 and lead C203, relay 260, contacts 272, NP springs 299 to EC lead C293 on which interrupted ground pulses appear in much the same manner as in the cited Lomax patent. Both ringing relay 170 and combined busy-ring relay 260 operate. At contacts 171, ring-back tone is transmitted from RB lead C169, through condenser 196, contacts 171, condenser 119, upper contacts 112 to the calling station. Ringing current is transmitted to the called station over a circuit as follows: interrupted generator lead C244 (in Fig. 2), resistor 249, contacts 263, 277, lead C201, contacts 181, upper contacts 113, contacts 179, 173, 172, upper winding of relay 160, contacts 161, 176, upper contacts 112, contacts 182, lead C202, contacts 271 and lead C292 to the called station 12. Ring cut-off relay 160 is thereby placed to react to the response of the called station.

When the called station 12 answers, the called line loop is closed completing the previously described ringing circuit to lead C291, contacts 276, 264, and ground. Relay 160 operates over this circuit. At contacts 161, the ringing current to the called party is cut off. At contacts 162, the previously described operate path to relay 150 is opened; at contacts 165, the ringing machine start is opened. At contacts 163, relay 160 locks itself over a circuit from battery, through the lower winding of relay 160, contacts 163, 192, and 145 to ground. Further, at contacts 161, a path is closed from battery at relay 120 through the upper winding of relay 120, contacts 161, 176, 112, 182, lead C202, contacts 271, lead C292, the called line loop, lead C291, contacts 276, 264, and ground. Relay 120 operates to reverse the talking conductors at contacts 121 and 122.

Relay 150 releases opening the pickup lead at 151, and at 152 opening the operate path to relay 170. Relay 170 releases which causes relay 260 to release. Relay 120 then is maintained over a circuit as follows: Battery, the upper winding of relay 120, contacts 161, 176, 112, 182, —L wiper and lead C202, contacts 271, —L wiper and lead C292, the called telephone 12 line loop, lead C291 and +L wiper, contacts 276, 263, 277, lead C201 and +L wiper, contacts 181, 113, 179, 173, 164, lower winding of relay 120, and ground. Relay 120 and 130 remain operated to supply talking battery to both parties. The circuits are released in a known manner at the conclusion of the conversation.

*Trunk hunting service*

The connector 200 has stepped vertically to a level having operative normal post springs 299 which then operate. At this time, relays 130, 140, 175, and 180 in the selector 100 are operated as are relays 210, 230, and 250 in the connector 200. As is normal practice with P.B.X service, all EC terminals except the last in a group are strapped to the C leads for automatic stepping.

After the switch takes one rotary step in the manner set out previously, if the first station terminal is busy, ground is found on lead C293 and is transmitted through NP spring 299, contacts 253 to relay 250 and battery. Relay 230 will release at the end of its slow-to-release time interval. Relay 250 remains operated. The ground on lead C293 is fed through NP spring 299, contacts 252, 231, and rotary interrupter contacts 286 to relay 240. Relay 240 operates. At contacts 241, direct ground is placed on rotary magnet 285. Rotary magnet is energized stepping the switch once and opening rotary interrupter contacts 286 to release relay 240. Both rotary magnet 285 and relay 240 are thereby released. The station terminals are again tested and on a busy condition as evidenced by ground on lead C293, relay 240 will re-operate initiating another rotary step.

If the called line is idle, relay 250 releases. Resistance battery is found on lead C294 and is transmitted through contacts 254, lower winding of ringing relay 270, VON springs 282, contacts 212, 297, and 201, to the multiple holding ground on lead C204. Relay 270 then operates and locks itself to the multiple hold ground on lead C204 through the frequently described circuit. Interrupted ground pulses on lead C295 are transmitted through NP springs 299, contacts 272, relay 260, lead C203, contacts 184, 152, relay 170 to battery. Both relays 170 and 260 operate and the ringing cycle as described previously is entered into.

The remaining operations to complete the call are the same as those described previously and the release of the switch train after completion of the call is accomplished in a generally known and obvious manner.

What is claimed is:

1. In a telephone system, a calling line, two automatic switches, means for operating the first of said switches to extend a connection from said calling line to the second of said switches via an interconnecting trunk line, a line relay in said second switch, a ringing control relay in said first switch, means for closing a series circuit including said line relay and said ringing control relay to operate said line relay and said ringing control relay in series over said trunk line, means for intermittently operating said line relay over said series circuit, means in said second switch responsive to said intermittent operation of said line relay for operating said second switch to extend said connection to a called line, means responsive to said extension of said connection to said called line for opening said series circuit to restore said ringing control relay, and means responsive to the restoration of said ringing control relay for automatically connecting ringing current to said called line in case said called line is idle.

2. In a telephone system, a calling line, two automatic switches, means for operating the first of said switches to extend a connection from said calling line to the second of said switches via an interconnecting trunk line, a line relay in said second switch, a ringing control relay in said first switch, means for closing a series circuit including said line relay and said ringing control relay in series over said trunk line, means for intermittently operating said line relay over said series circuit, means in said second switch responsive to said intermittent operation of said line relay for operating said second switch to extend said connection to a called line, means responsive to said extension of said connection to said called line for opening said series circuit to restore said ringing control relay, and means responsive to the restoration of said ringing control relay in case said called line is busy for automatically connecting busy tone to said calling line.

3. In a telephone system as claimed in claim 1 wherein said means for connecting ringing current to said called line includes a source of ringing current in said second switch, a ring relay in said second switch for connecting said ringing current back over one conductor of said trunk line to said first switch, and a second ring relay in said first switch for further extending said ringing current over another conductor of said trunk line from said first switch to said second switch and to said called line.

4. In a telephone system as claimed in claim 1 wherein said ringing control relay is provided with slow-to-release characteristics to maintain said relay in operated position over said series circuit during the intermittent operation of said line relay.

5. In a telephone system as claimed in claim 1 wherein said means for connecting ringing current to said called line includes a pick-up relay in said first switch operated responsive to the restoration of said ringing control relay and a first ring relay in said second switch controlled over said trunk line by the operation of said pick-up relay for connecting said ringing current to said called line.

6. In a telephone system as claimed in claim 5 including a second ring relay in said first switch connected in a series circuit with said first ring relay over said trunk line by the operation of said pick-up relay, and means for intermittently operating said first and second ring relays over their series circuit to intermittently signal the called subscriber on said called line.

7. In a telephone system as claimed in claim 6 wherein the series circuit for said line relay and said ringing control relay includes the two talking conductors of said trunk line and the series circuit for said first and second ring relays includes a third conductor of said trunk line.

8. In a telephone system as claimed in claim 1 including a ring cut-off relay in said first switch operated in response to the subscriber on said called line answering for cutting off the application of ringing current.

9. In a telephone system as claimed in claim 8 including a battery feed relay in said first switch, and means responsive to the operation of said ring cut-off relay for connecting said battery feed relay to said called line.

10. In a telephone system, an automatic switch having wipers operable in primary and secondary movements, a primary magnet in said switch for stepping said wipers in a primary movement, a pick-up relay in said switch, circuit means for operating said pick-up relay in parallel with said primary magnet, means whereby said pick-up relay is made slow-acting so that it is held operated during the primary stepping of said wipers to maintain the operating circuit to said primary magnet, means for releasing said pick-up relay after said primary movement, a second switch, means for thereafter operating said wipers in a secondary movement to extend a connection to said second switch and for operating said second switch to complete a connection to an idle called line, means for reoperating said pick-up relay in response to said second switch completing said connection to said called line, and means controlled by the reoperation of said pick-up relay for causing the application of ringing current to said called line.

11. In a telephone system, a calling line, a selector, a connector, a multiple conductor trunk, means for extending a connection over said multiple conductor trunk from said calling line to said selector and connector, said connector having a plurality of levels, each of said levels including a plurality of sets of station terminals, wiper sets in said connector for sequentially engaging terminal sets of a level, normal post springs on specified levels of said connector, said normal post springs operative upon said wiper sets reaching one of said specified levels, stepping means operative in combination with the operation of said normal post springs for causing said wiper sets to step self-interruptedly across said one level to an idle set of station terminals, a ring cut-off relay in said selector, a prepared serial ringing circuit including said ring cut-off relay extending through said connector and selector, an interrupted ground pulse source for transmitting interrupted ground pulses, means operable through said operative normal post springs for transmitting said interrupted ground pulses to intermittently open and close said serial ringing circuit over a first of said trunk conductors, answering means operative for closing an operating path to said ring cut-off relay over a second and third of said trunk conductors, and means controlled in response to said operation of said ring cut-off relay for interrupting said serial ringing circuit.

12. In a telephone system, a calling line, a selector, a connector, means for extending a multiple connection from said calling line to said selector and connector, said connector having a plurality of levels of bank contact sets, each of said levels of bank contact sets interconnecting station trunks, a wiper set in said connector for sequentially engaging bank contact sets of said connector, normal post springs on specified levels of said connector, said normal post springs operative upon said wiper sets reaching said specified levels, stepping means operative under the control of said calling line for stepping said wiper sets to said levels, means including the operation of said normal post springs for causing said wiper sets to step self-interruptedly across one of said specified levels to a marked idle set of bank contacts, a ring cut-off relay in said selector, a source of ringing current in said connector, a ringing circuit comprising said ringing current and the winding of said ring cut-off relay, means for closing said ringing circuit to one of said station trunks responsive to said wiper sets engaging said marked idle set of bank contacts, an interrupted ground pulse source for transmitting interrupted ground pulses, means operable through said operative normal post springs for transmitting said interrupted ground pulses to intermittently interrupt said ringing circuit, means effective to an answering operation to complete an operating path to said ring cut-off relay, and means controlled in response to said operation of said ring cut-off relay for disconnecting said ringing circuit.

References Cited in the file of this patent

UNITED STATES PATENTS

| | | |
|---|---|---|
| 1,356,639 | Lundell | Oct. 26, 1920 |
| 1,660,975 | Quass | Feb. 28, 1928 |
| 2,816,170 | Gatzert | Dec. 10, 1957 |